UNITED STATES PATENT OFFICE.

FREDERICK E. SMALL, OF NEEDHAM, MASSACHUSETTS.

PISTON-PACKING.

1,173,319.  Specification of Letters Patent.  Patented Feb. 29, 1916.

Application filed February 26, 1915. Serial No. 10,852.

*To all whom it may concern:*

Be it known that I, FREDERICK E. SMALL, a citizen of the United States, and resident of Needham, in the county of Norfolk and State of Massachusetts, have invented new and useful Improvements in Piston-Packings, of which the following is a specification.

This invention relates to piston packings and while adapted to the packing of pistons generally, it is especially designed for the packing of pistons of internal combustion engines. In such engines the cylinder is cooled in operation while the piston is hot, and the latter therefore expands more than the cylinder and must fit loosely within the cylinder to avoid binding. In order to maintain the high compression which is necessary, the packing must be tight not only between the packing and the cylinder but between the packing and the groove of the piston to prevent leakage underneath the piston rings. The packing must also be capable of accommodating itself to inequalities in the surface of the cylinder due to wear or similar defects. A type of packings commonly used, known as snap rings, are open to many objections hereinafter referred to, and the object of the present invention is to provide piston packings of this character which will overcome these objections.

The invention consists in the novel features of construction hereinafter described and particularly pointed out in the claims.

In the accompanying drawings which illustrate certain embodiments of the invention,—

Figure 1:
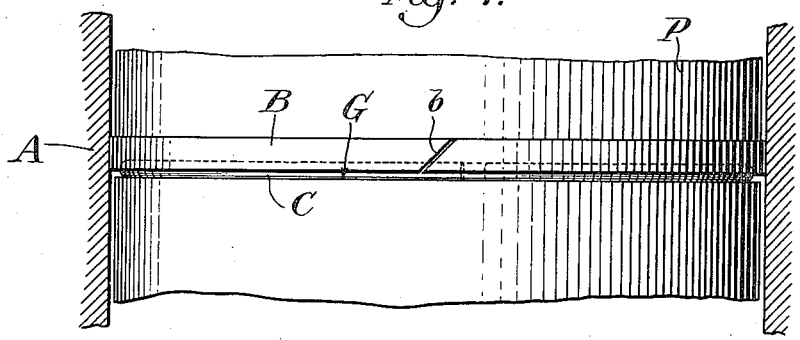
Figure 2:
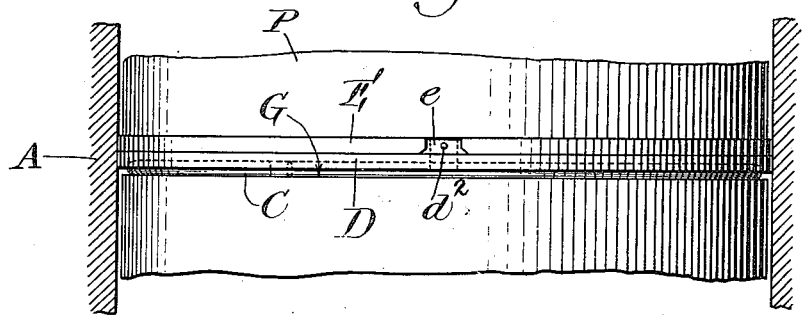
Figure 3:
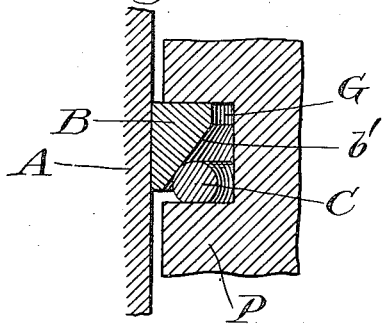
Figure 4:
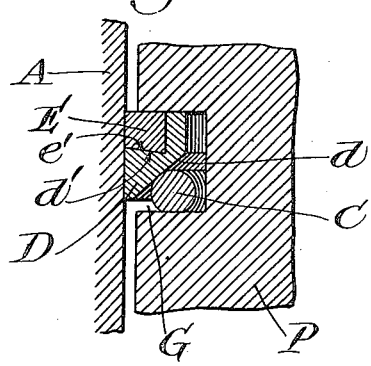

Figure 1 is a side elevation of a piston packing in place on the piston head; Fig. 2 is a similar view showing a modified form of packing; Fig. 3 is an enlarged detail view in cross section of the packing shown in Fig. 1; and Fig. 4 is an enlarged detail view in cross section of the packing shown in Fig. 2.

Heretofore it has been the invariable practice so far as I am aware in the manufacture of snap packing rings, so-called, to make the ring exactly to fit and fill the groove in the piston. With this construction the ring must needs be sprung over the piston all at once and snapped into the groove all at once. This tends to stretch and distort the ring so that it will not make a good joint with the cylinder, and also frequently results in the breaking of the ring. The removal of such snap rings is attended with even greater difficulties since there is not only the danger of distorting or breaking the ring in getting it out of the groove, but it cannot be removed at all without inserting the usual expanding strips under the ring in a manner familiar to engineers. It has also been the practice heretofore to make snap rings of larger exterior circumference than the circumference of the cylinder; the ring is then compressed into the bore of the cylinder and the natural tendency of the ring to expand is relied upon to make tight joint with the cylinder. When such a ring is compressed into the bore of the cylinder there is a slight distortion of the ring so that it does not make a true fit, and further there is a tendency for the ring to elongate a little in the direction of the diameter passing through the cut, so that the ring bears harder at its ends adjacent to the cut and at the portion opposite the cut than at other points.

Among the principal objects of the present invention is to provide a structure wherein the packing rings may be more easily applied to and removed from the grooves in pistons, and with less likelihood of distortion or breaking; and further a structure in which the packing ring is turned to substantially the same size as the cylinder bore, so that it will in its normal condition make a true fit with the cylinder bore and bear equally thereon at all points.

Referring to the drawings, A represents the cylinder, P the piston, and G the annular groove or channel in the piston for receiving the packing rings.

In the forms shown in Figs. 1 and 3, the packing consists of a suitable ring B divided at a single point *b* but otherwise continuous. The ring is resilient, but instead of expanding into contact with the cylinder bore by its own resiliency, it is preferably turned to substantially the same size as the cylinder bore. The cut *b* is preferably made on a line diagonal to the axis of the piston, and the clearance between the cut ends of the ring when in normal position within the cylinder is so minute that the leakage therethrough is small. Such leakage is no greater than in the case of ordinary snap packing rings. The inner side of the ring B is made with an inwardly facing bevel surface *b'*. C is a spring follower ring divided at a single point and normally tending to expand by its own resiliency. The follower ring C is preferably made of round, drawn steel wire ground flat on the side which bears against the side wall of groove G. One advantage of using a follower ring of this form is that the round surface which bears against the bevel surface $b'$ accommodates itself to any angle or form of bevel and does not require the nice fitting which would be necessary if a spring follower ring were used with a beveled surface formed to fit the bevel $b'$. Furthermore, the rounded surface ring is cheaper to make and more certain and perfect in its action than a follower ring with a beveled surface to fit the bevel $b'$. The ground flat surface of the follower ring C which bears against the side wall of the channel G possesses the advantage that there is less likelihood of the ring wearing a groove in the side wall of the channel, and less likelihood of the ring C becoming wedged between the ring B and the wall of the channel, than if the ring C were left circular in cross section.

It should be noted that the width of the ring B is substantially less than the width of the groove G in the piston so that a clearance of substantial width is provided between one side of the packing ring and one side of the groove. This enables the packing ring to be easily inserted into the groove by first inserting one end of the ring into the groove, bending or springing the ring open slightly for that purpose and tipping the ring relatively to the axis of the piston, and then springing the rest of the ring into the groove by following around the ring until the whole is sprung into the groove. This operation will be facilitated by the presence of the bevel $b'$. The ring may be removed in a similar manner by first starting one end out of the groove, then tipping the ring a little to the axis of the piston and following it around until the whole ring is removed from the groove. This method of inserting and removing the ring is made possible by having the groove substantially wider than the ring so that the groove will receive the ring when tipped or tilted to the axis of the piston.

The follower ring C, acting on the bevel surface $b'$, by reason of its expansion exerts a constant pressure on ring B. One component of the force tends to expand the ring B radially and press its periphery close against the cylinder bore, while the other component of said force tends to thrust said packing ring endwise of the piston and thereby hold it close against one side wall of groove G. Thus the packing is maintained tight against loss of pressure both between the ring and the cylinder and also underneath the ring between the ring and the piston.

The same characteristic feature consisting in a packing substantially narrower than the groove in the piston head and forced into close engagement with the piston and cylinder by a follower ring, is present in the modification illustrated in Figs. 2 and 4. In these figures the cylinder A, the piston P and the groove G may be substantially the same as already described. Instead of a one piece packing ring however, the packing ring illustrated in these figures consists of a resilient ring D divided at a single point but otherwise continuous and having an L-shaped form in cross section, one flange of the L extending laterally and the other flange longitudinally of the piston. The end of the lateral flange abuts against the walls of the cylinder and the end of the longitudinal flange bears against one of the side walls of the groove G in the piston. The ring D is also provided with an inwardly facing bevel surface $d$ at the inner side of the ring, which is the outer angle of the L, and the spring follower C coöperates with the bevel surface $d$ to force the ring both outward and endwise precisely as in the construction first described.

Between the flanges of the L-shaped ring D is a second packing ring E also made of resilient material, divided at a single point $e$, and fitting exactly within the inner angle of the packing ring D. The ring E is arranged to break joint with the ring D and is held in joint breaking position by a pin $d^2$ on ring D, projecting into the space $e$ between the ends of ring E. The laterally extending flange of the ring D is undercut as shown at $d'$ and the abutting surface of the ring E is similarly beveled at $e'$ to fit the undercut surface $d'$. The purpose of this construction is to prevent any part of the ring E, and particularly its ends adjacent to the place $e$ where the ring is divided, from expanding into ports or depressions, if any, in the surface of cylinder A. In a ported cylinder, such as the cylinder of a two cycle gasolene engine, where the packing ring has to pass ports, it might happen that the ends of the packing ring E would spring into a port sufficiently to catch on the edge of the port, thereby breaking the ring and often damaging the cylinder. With the construction shown in Fig. 4 the follower spring C tends to press the packing against the wall of the groove G and while held in that position it will be impossible for the ring E to expand on account of the undercut surface $d'$ of the ring D, which slightly overlaps the ring E and holds it in place. In this form of the invention there is the same advantage as already explained in respect to making the groove G wider than the combined width of the packing D—E to facilitate inserting and removing the rings without distorting or breaking them.

In either form there is the further advantage that no fine fitting of the packings to the groove is necessary, as in the case of ordinary snap rings which exactly fit their grooves, since the extent of the clearance between the side wall of the groove G and the side of the packing is not material so long as the groove is sufficiently wide to permit the easy insertion or removal of the packing. As no nice fitting is required, my packings may be applied to old or worn grooves, or to grooves of various sizes within reasonable ranges of considerable extent. A still further advantage of making the groove wider than the packing is that a clear and free space is provided to admit steam or gas behind the rings, which aids in setting the packing by steam or gas pressure.

A two-piece packing of the type shown in Figs. 2 and 4, comprising an L-shaped ring and a filler ring, but without specifying the undercut surface $d'$ and the bevel $e'$, and without specifying the making of the outer circumference of the packing the same as the circumference of the cylinder bore, constitutes the subject matter of my former Patent No. 1,129,910, dated March 2, 1915, which patent was co-pending with the present application and in which an embodiment of the invention in such two-piece packing was specifically claimed.

I claim:

1. In combination, a piston having an annular groove therein, and a packing in said groove comprising a continuous resilient packing ring divided at a single point and having a beveled surface at its inner side, said packing being substantially less in width than the width of said groove, whereby a clearance is provided between one side of said packing and one side of said groove, and a spring follower ring engaging the beveled surface of the packing and one wall of the groove, adapted to urge said packing in both a radial direction and an endwise direction on the piston against the opposite wall of the groove.

2. In combination a cylinder, a piston loose within the cylinder and having an annular groove, and a packing in said groove comprising a continuous resilient packing ring divided at a single point and having a beveled surface at its inner side, the normal outer circumference of said ring being substantially the same as that of the cylinder bore, said packing ring being substantially less in width than the width of said groove, whereby a clearance is provided between one side of said packing and one side of said groove, and a spring follower ring engaging the beveled surface of the packing and one wall of the groove, adapted to urge said packing in both a radial direction and an endwise direction on the piston against the opposite wall of the groove.

3. In combination, a piston having an annular groove therein, and a packing in said groove comprising a continuous resilient packing ring L-shaped in cross section and divided at a single point, said ring having a beveled surface at its inner side, a second continuous resilient packing ring divided at a single point, filling the inner angle of said L-shaped ring and arranged to break joint therewith, the laterally extending flange of the L-shaped ring, which forms one side of said inner angle, being undercut to overlap the second ring and prevent the expansion of said second ring out of said inner angle, and a spring follower ring engaging the beveled surface of said L-shaped packing ring and one wall of said groove, adapted to urge said two packing rings in both a radial direction and an endwise direction on the piston against the opposite wall of said groove.

4. In combination, a piston having an annular groove therein, and a packing in said groove comprising a continuous resilient packing ring L-shaped in cross section and divided at a single point, said ring having a beveled surface at its inner side, a second continuous resilient packing ring divided at a single point, filling the inner angle of said L-shaped ring and arranged to break joint therewith, the laterally extending flange of the L-shaped ring, which forms one side of said inner angle, being undercut to overlap the second ring and prevent the expansion of said second ring out of said inner angle, the combined width of said rings being substantially less than the width of said groove, whereby a clearance is provided between one side of said packing rings and one side of said groove, and a spring follower ring engaging the beveled surface of said L-shaped packing ring and one wall of said groove, adapted to urge said two packing rings in both a radial direction and an endwise direction on the piston against the opposite wall of said groove.

Signed by me at Boston, Massachusetts, this 24th day of February, 1915.

FREDERICK E. SMALL.

Witnesses:
ROBERT CUSHMAN,
JOSEPHINE H. RYAN.